United States Patent [19]
Goswami

[11] 3,924,173
[45] Dec. 2, 1975

[54] COMMUTATION CIRCUITS IN INVERTER CIRCUITS

[76] Inventor: Sushil Kumar Goswami, 100 Ramton Road, Willingham, Cambridgeshire, CB4 5JO, England

[22] Filed: June 17, 1974

[21] Appl. No.: 480,253

[30] Foreign Application Priority Data
June 28, 1973 United Kingdom............... 30781/73
June 28, 1973 United Kingdom............... 30782/73
July 10, 1973 United Kingdom............... 32773/73

[52] U.S. Cl................................... 321/5; 321/45 C
[51] Int. Cl.²....................................... H02M 7/515
[58] Field of Search............................ 321/5, 45 C

[56] References Cited
UNITED STATES PATENTS

| | | | |
|---|---|---|---|
| 3,340,453 | 9/1967 | Bradley et al..................... | 321/45 C |
| 3,474,320 | 10/1969 | Chandler........................... | 321/45 C |
| 3,504,266 | 3/1970 | Schlabach et al................. | 321/45 C |
| 3,628,126 | 12/1971 | Kawakami et al................. | 321/45 C |
| 3,838,330 | 9/1974 | Rosa................................. | 321/5 |

Primary Examiner—Gerald Goldberg
Attorney, Agent, or Firm—Young & Thompson

[57] ABSTRACT

An inverter for supplying alternating current to a load from a direct current supply including a thyristor bridge for connecting the phase load or loads between the terminals of the direct current supply through respective inductors, or parts thereof. A flywheel diode bridge is also provided for returning energy induced by the load to the power supply. A commutation circuit, including a commutation capacitor is arranged for inducing thyristor turn-off voltage pulses in the inductors. The components are arranged, or means are provided, for reducing the voltage rating of the thyristors. Thus the connection of the commutation circuit to the inductors is such that the commutation capacitor voltage is applied across a different number of windings in various periods of the duration of the voltage pulse; the inductors may each have a second winding connected between an end of the flywheel diode bridge and the supply terminal opposite to that to which the first winding is connected; the commutation may be arranged never to be connected directly across the supply terminals, an auxiliary rectifier being provided for charging up and maintaining the voltage across the capacitor; the commutation capacitor may comprise two capacitors which are arranged in series between the supply terminals, and are selectively connectable to the inductors for generating the turn-off voltage pulse.

23 Claims, 29 Drawing Figures

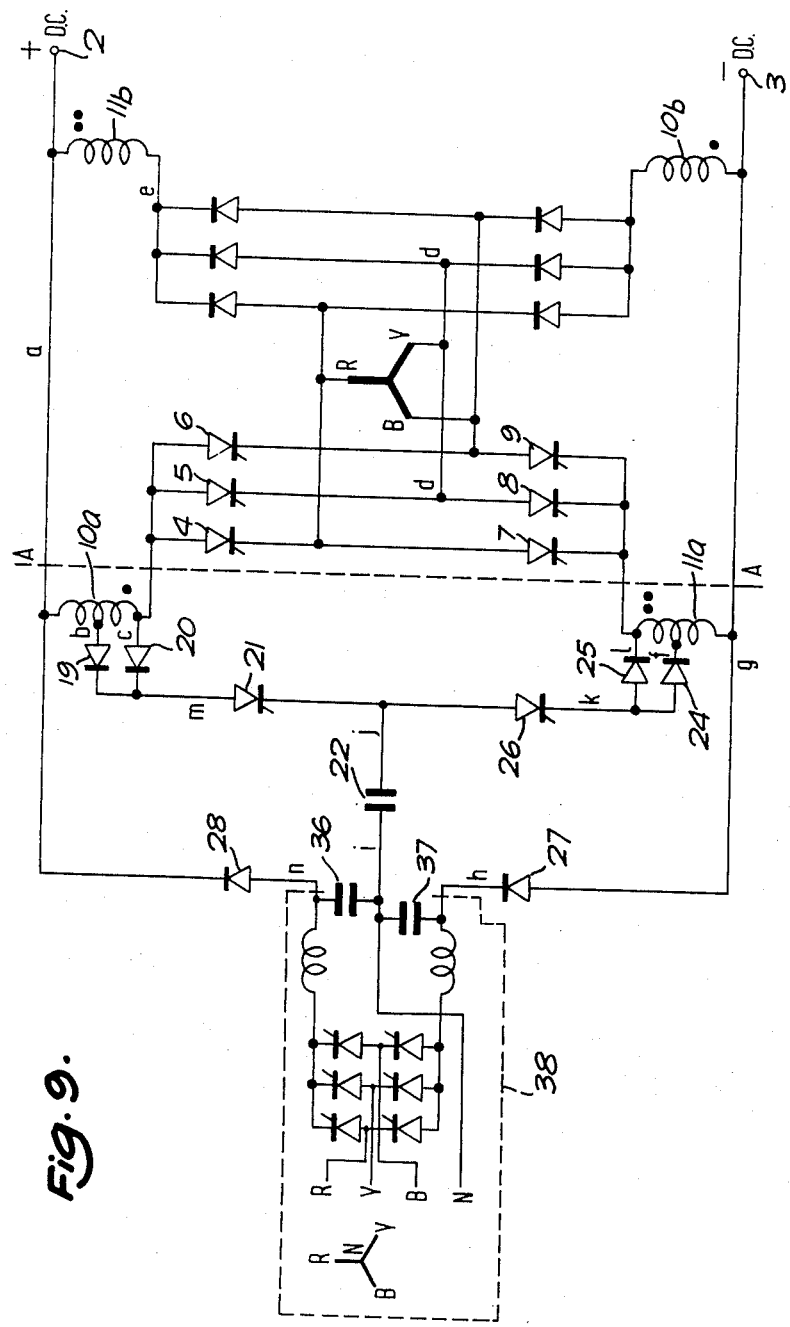

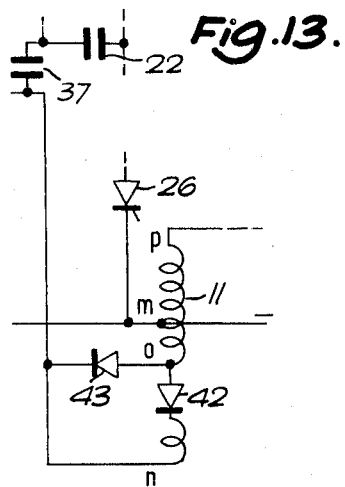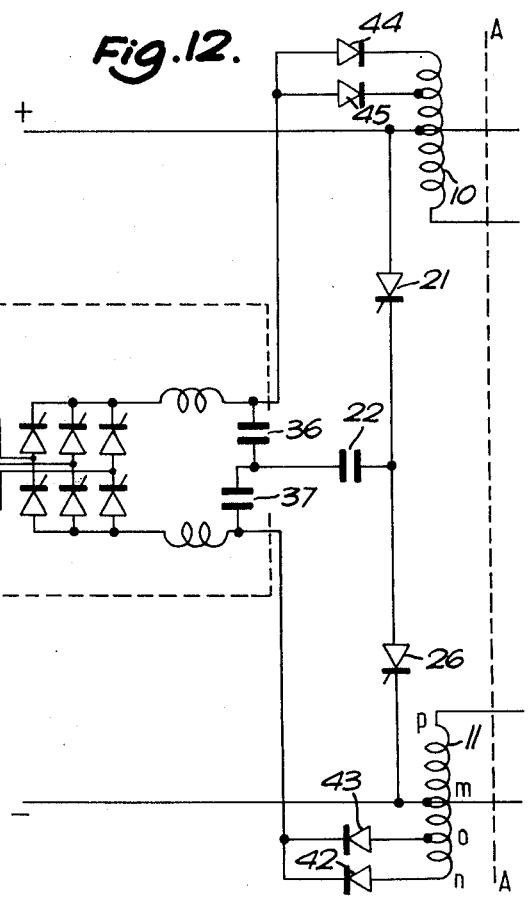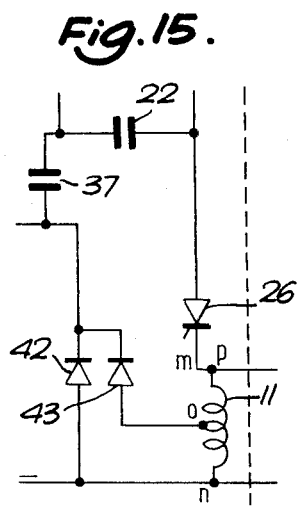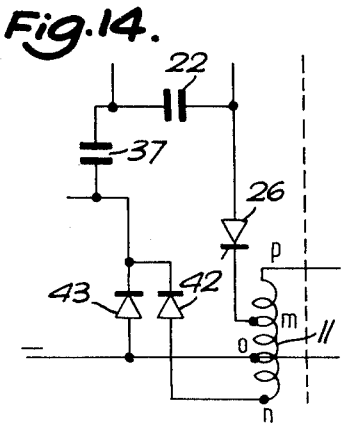

3,924,173

COMMUTATION CIRCUITS IN INVERTER CIRCUITS

This invention relates to inverter circuits for supplying alternating current to a load from a direct current supply.

Inverter circuits commonly comprise an arrangement of controllable rectifiers, usually thyristors, connected to the individual phases of the load, and triggerable to connect those phases between the positive and negative terminals of the D.C. power source.

A well known form of inverter circuit is illustrated in FIG. 1 of the accompanying drawings, and there follows a brief description of this illustrated arrangement.

A three phase load 1 is supplied from the positive and negative supply terminals 2 and 3 of a d.c. supply, hereinafter called the main dc supply or simply the dc supply, R, Y and B phases of the load are connectable to the positive supply terminal 2 via thyristors 4, 5 and 6 respectively, and to the negative supply terminal 3 via thyristors 7, 8 and 9 respectively. Thyristors 4 to 9, which comprise the inverter thyristor bridge, are hereinafter called inverter-thyristors or simply thyristors. Thyristors 4, 5 and 6 are connected to the positive supply terminal via a first inductor 10, the inductor end which is connected to thyristors 4, 5 and 6 is called the inverter end, and the other end of the inductor which is connected to the positive supply terminal 2 is called the supply end, Similarly, thyristors 7, 8 and 9 are connected to one end, called the inverter end, of the second inductor 11. The other end of the inductor 11, called the supply end, is connected to the negative supply terminal 3.

The R, Y and B phases of the load 1 are also connected to the positive supply terminal 2 via the respective free-wheeling diodes 12, 13 and 14, and to the negative supply terminal 3 via the respective free-wheeling diodes 15, 16 and 17.

To turn off a thyristor, say thyristor 8, an appropriately charged commutation capacitor in the commutation circuit is, at say instant $t_1$, connected to inductor 11 to make the inductor's end l positive with respect to g. If this voltage is larger than the dc supply voltage, and remains so for more than the turn-off time of thyristor 8, the thyristor is reverse biased for its turn-off time, or longer, and is thereby turned off.

Starting from its value at instant $t_1$, the voltage across the inductor at first decreases to zero and then, during the re-set period, grows in reverse till it reaches a steady reversed value nearly equal to the initially applied voltage, when current reduces to zero and the inductor is disconnected from the commutation capacitor circuit. This reversed voltage across the inductor during the re-set period causes the voltage rating required of the inverter thyristors to be increased. A further cause of increase in this voltage rating can be that the commutation circuit gets charged to excessively high values.

The above described known inverter suffers, therefore, from the disadvantage of requiring components of relatively high rating.

It is desirable to reduce the voltage ratings of the inverter circuit, i.e. to reduce the voltage rating of inverter thyristors, and also the voltage, and therefore current, ratings of the components comprising the commutation circuit.

For this reduction in the voltage rating of the inverter circuit, one or more of the following three steps may be taken:

1. The voltage induced across the said inductors during the re-set period may be reduced.
2. The commutation circuit capacitor should not be over-charged.
3. Any excess charge or energy should be extracted from the commutation capacitor circuit STEP 1 may be achieved by the selective connection of the voltage available from the commutation capacitor circuit so as to apply this voltage to a larger number of inductor turns during the re-set period and to a smaller number of inductor turns during the period of producing the thyristor turn-off voltage pulse. The said selective connection between the commutation capacitor circuit and the inductor is achieved by a combination of thyristors and diodes to provide steering and return paths in the commutation capacitor circuit.

In the general case, each said inductor has three points of connection — say points $v$, $w$ and $x$ — across two alternative pair combinations of which, with the intermediate point appearing in only one pair combination, the voltage available from the commutation capacitor circuit can be selectively connected. By changing from one to the other pair of connection points, the number of turns across which the voltage from the commutation capacitor circuit is applied can be changed. Each said inductor has two additional points — say $y$ and $z$ — where one end of the inverter thyristor bridge and one dc supply line, respectively, are connected. In the general case, therefore, five points — namely $v$, $w$, $x$, $y$ and $z$, with points $y$ and $z$ located anywhere with respect to points $v$, $w$ and $x$ — are possible on each said inductor.

In particular cases, however, one of the points $v$, $w$ and $x$ may be coincident with one of the points $y$ and $z$; alternatively, in particular cases, any two of the points $v$, $w$ and $x$ may be coincident with points $y$ and $z$, for example, point $v$ may coincide with point $y$ whilst point $x$ coincides with point $z$. Moreover, this notation — $v$, $w$, $x$, $y$ and $z$ — will not be employed in particular cases; for example, in the particular case of FIG. 2 these five points reduce, by coinciding, to three called $l$, $f$ and $g$.

STEP 2 The dc supply is prevented from supplying any energy at all to the commutation capacitor by ensuring that the commutation capacitor is never connected across the dc supply. Instead, the commutation capacitor is connected across the first inductor, provided the capacitor is charged in the appropriate polarity for connection to the first inductor, by completing one loop via the thyristors and diodes which provide the steering and the return paths. This produces the required thyristor turn-off voltage pulse across the inductor. At the end of the subsequent re-set period, due to the ringing effect of an inductor-capacitor circuit, the commutation capacitor is left charged with its polarity reversed. Next time, therefore, the commutation capacitor can be connected in the second loop including the second inductor to produce thyristor turn-off pulse across the second inductor.

However, means must be provided to provide the initial charge and subsequent losses in this type of commutation capacitor circuit. This is provided by arranging that an auxiliary alternating current supply energises an auxiliary controlled rectifier circuit the direct-current terminals of which, with the option of an auxiliary capacitor across them, are connected in series with uni-directional current part of a commutation circuit loop, the auxiliary rectifier circuit current carrying capability being in the same direction as the uni-directional current in the commutation circuit loop.

It is preferable that the auxiliary rectifier circuit is at least half-controlled, rather than not controlled at all, because then the energy supplied by the auxiliary rectifier circuit can be regulated. It is even more preferable if the auxiliary rectifier circuit is fully controlled when it has the capability of reversing its dc output voltage, and thereby of extracting any excess from the commutation circuit.

Extraction of excess energy from the commutation circuit is more fully discussed in Step 3.

STEP 3 One way of extracting energy from the commutation capacitor, by making the auxiliary rectifier circuit fully controlled, has already been mentioned in Step 2.

Another way is to provide each inductor with a secondary winding. The secondary windings of the two inductors act in conjunction with the flywheel diode bridge to deliver to the dc supply any excess commutation capacitor energy. This method is applicable to the circuit of Step 2.

The aforementioned Steps to reduce voltage rating requirements of an inverter can be employed in a number of different combinations.

According to one aspect of the invention, there is provided an inverter for supplying alternating current to a load from a direct current supply, comprising a respective pair of first and second controlled rectifiers for connecting each phase load to the positive and negative terminals of the direct current supply, the first controlled rectifier of each pair being connected to the positive supply terminal through at least part of a first inductor, and the second controlled rectifier of each pair being connected to the negative supply terminal through at least part of a second inductor, a respective pair of flywheel diodes also for connecting each phase load to the direct current supply terminals and a commutation circuit including a selectively dischargeable commutation capacitor for causing current to flow in one or other of said inductors and thereby to reverse bias a conducting one of the rectifiers connected thereto, each said inductor winding having three points connected in said commutation circuit, namely an intermediate point and a further point on either side thereof the intermediate point and one of said further points each being connected via a respective single anode rectifier, into a respective loop containing the commutation capacitor, the loop completing itself through the other said further point on the inductor.

According to another aspect of the invention, there is provided an inverter for supplying alternating current to a load from a direct current supply, including a controlled rectifier bridge which comprises a respective pair of first and second controlled rectifiers for connecting each phase load to the positive and negative terminals of the direct current supply, the first controlled rectifier of each pair being connected to the positive supply terminal through at least part of a first inductor, and the second controlled rectifier of each pair being connected to the negative supply terminal through at least part of a second inductor, a flywheel diode bridge comprising a respective pair of flywheel diodes also for connecting each phase load to the direct current supply terminals and a commutation circuit including a selectively dischargeable commutation capacitor for causing current to flow in one or other of said inductors and thereby to reverse bias a conducting one of the rectifiers connected thereto wherein each inductor is provided with a second winding, which is magnetically coupled with the first winding of the inductor, the second winding of the first inductor being connected between the negative direct current supply terminal and the respective end of the flywheel diode bridge, and the second winding of the second inductor being connected between the positive direct current supply terminal and the respective end of the flywheel diode bridge, the polarity of the first and second windings of each inductor being such that when the first windings of the second inductor makes the thyristor bridge end connected thereto more positive than the negative supply potential, the second winding thereof makes the flywheel diode bridge end connected thereto less positive, than the positive supply potential, and such that when the first winding of the first inductor makes the thyristor bridge end connected thereto less positive than the positive supply potential the second winding thereof makes the flywheel diode bridge end connected thereto more positive than the negative supply potential.

According to a further aspect of the invention, there is provided an inverter wherein each of said first or second windings has three points connected into said commutation circuit, namely an intermediate point and a further point on either side thereof, the intermediate point and one of said further points being connected via a respective single anode rectifier into a respective loop containing the commutation capacitor, the loop completing itself through the other said further point on the inductor.

According to yet another aspect of the invention there is provided an inverter wherein a single-anode rectifier is series-connected, in the commutation loop, between the other terminal of commutation capacitor and the point on the other side of the intermediate point on the inductor.

These different aspects are all linked by the common object, which is to reduce the voltage rating of the controlled rectifiers used.

Some embodiments of the invention will now be described by way of example, with reference to the accompanying drawings in which:

FIG. 9 illustrates one complete inverter circuit according to the invention;

FIG. 12 illustrates a modification of the circuit of FIG. 9 or 11;

FIGS. 13, 14 and 15 illustrate different arrangements of various parts of the inverter circuit of FIG. 12;

Figure 16:
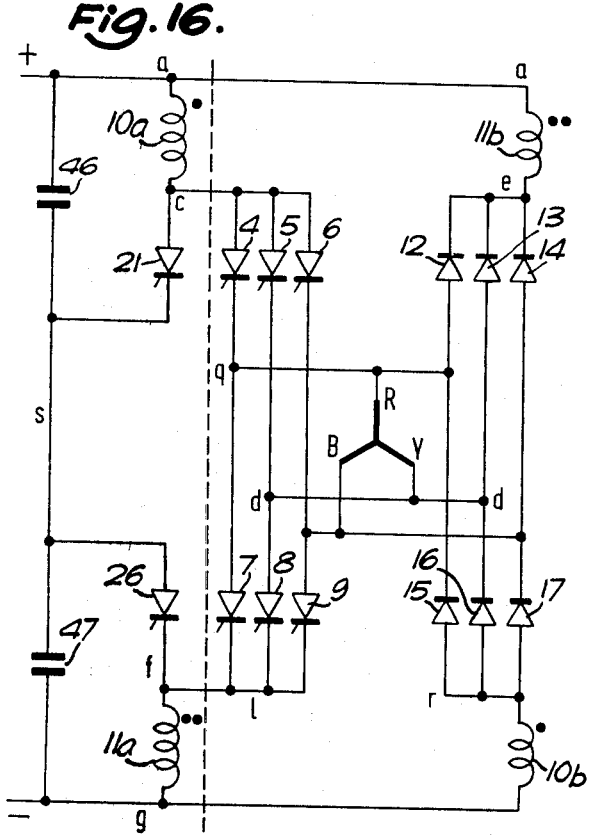
FIG. 16 illustrates another inverter circuit according to the invention.
Figure 19A:
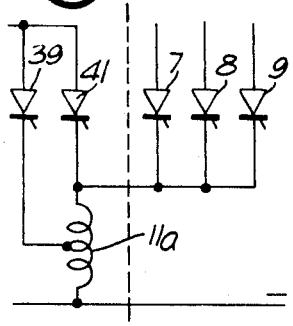
Figure 19B:
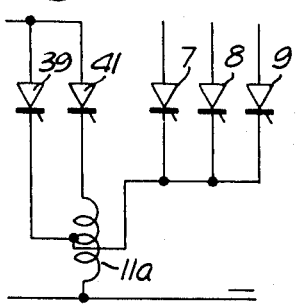
Figure 19C:
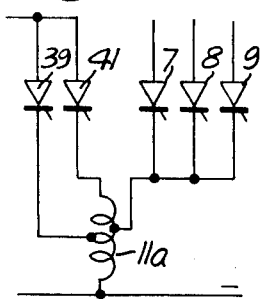
Figure 19D:
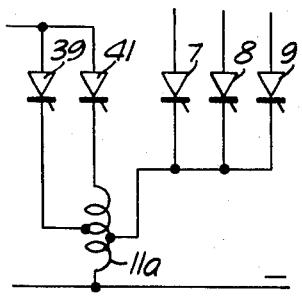
Figure 19E:
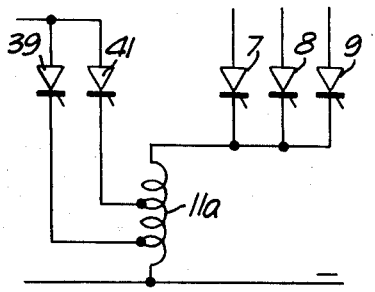
Figure 20:
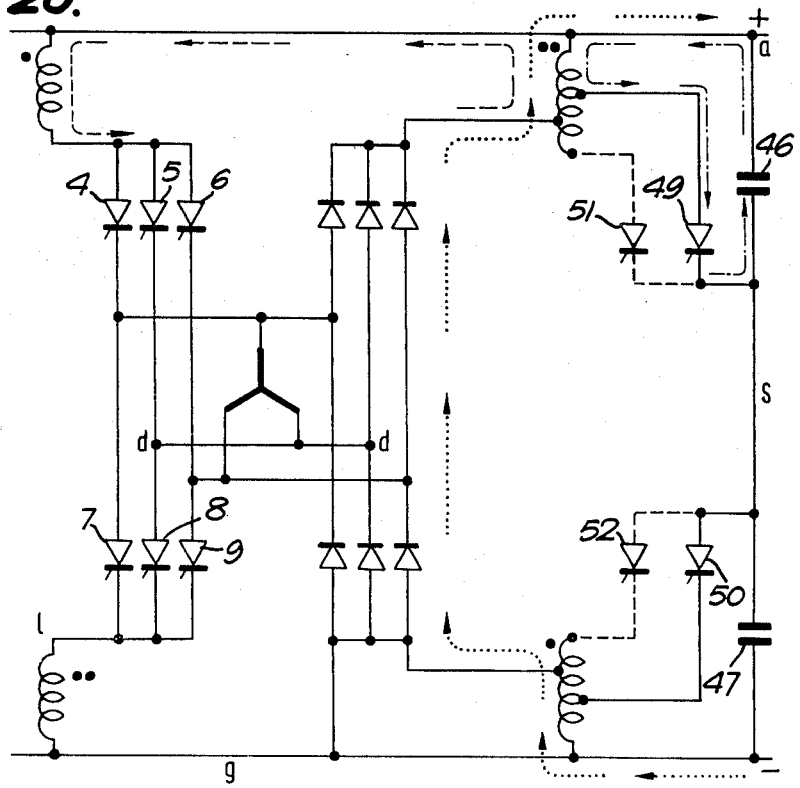
Figure 21:
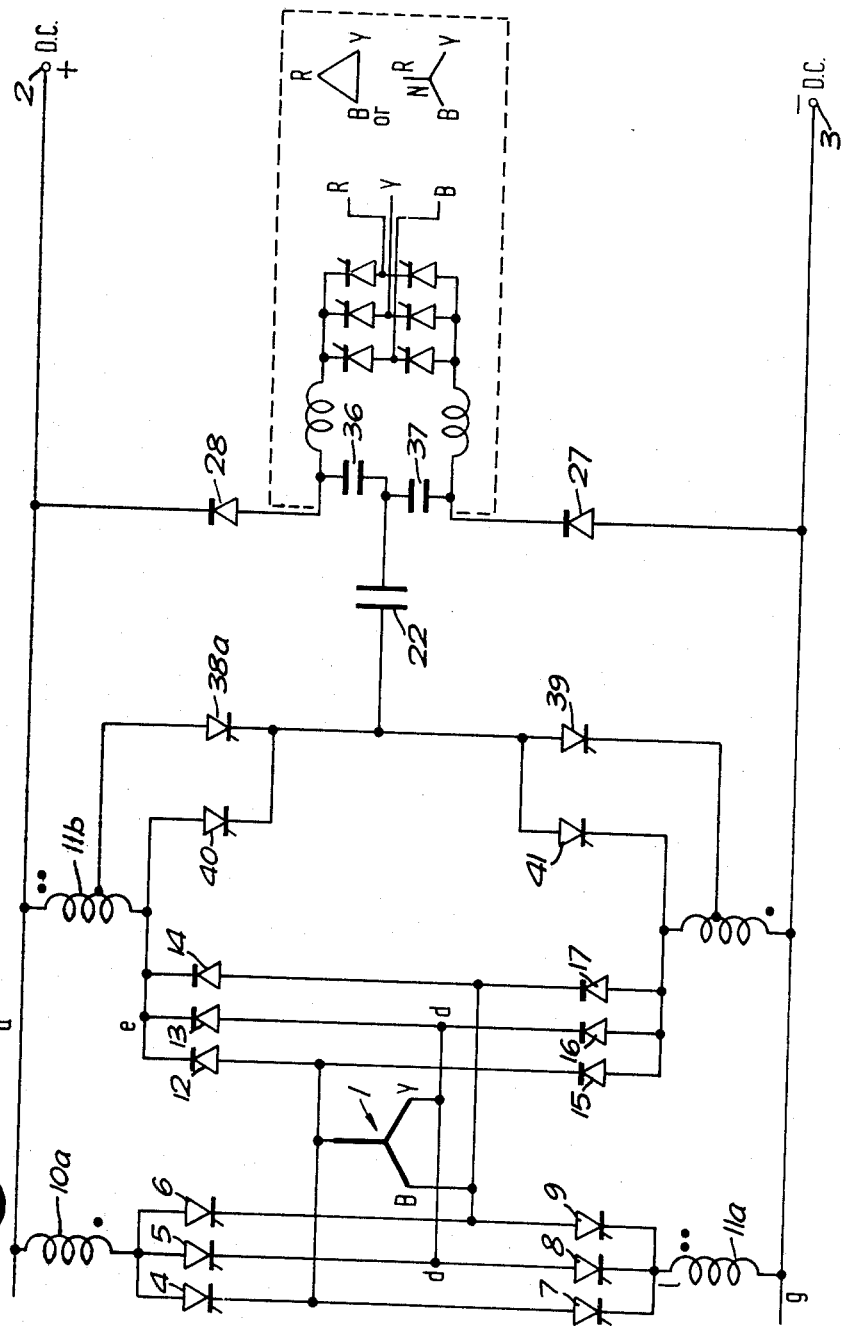

FIGS. 18a, 18b, and 19a to 19e illustrate different arrangements of the connections to the inductors which provide the thyristor turn-off voltage pulses;

FIGS. 20 and 21 correspond to the combination of FIGS. 16, and 19c, and to the combination of FIGS. 9 (without neutral connection) and 4c, respectively except that the commutation circuit is connected to the second instead of the first winding of each inductor.

Figure 1:
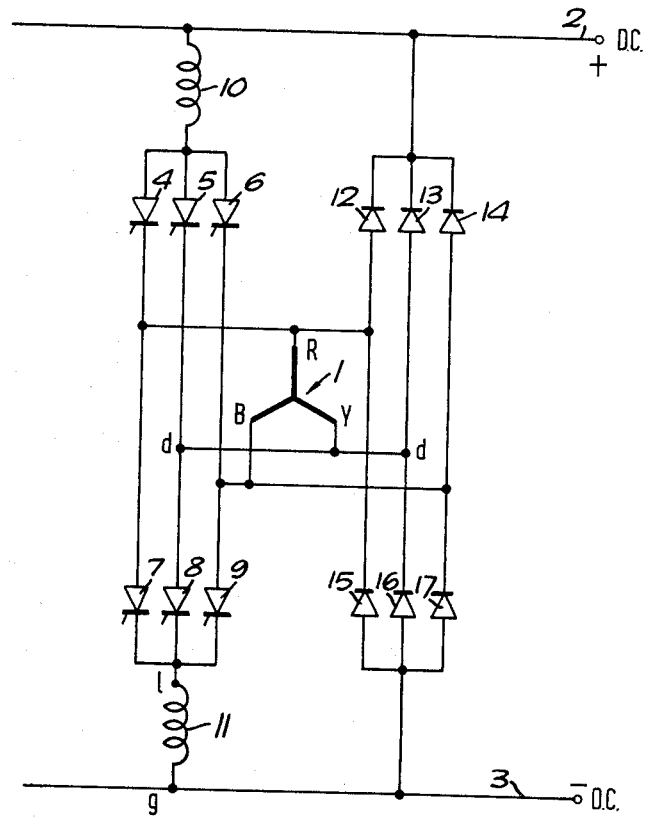
Figure 2:
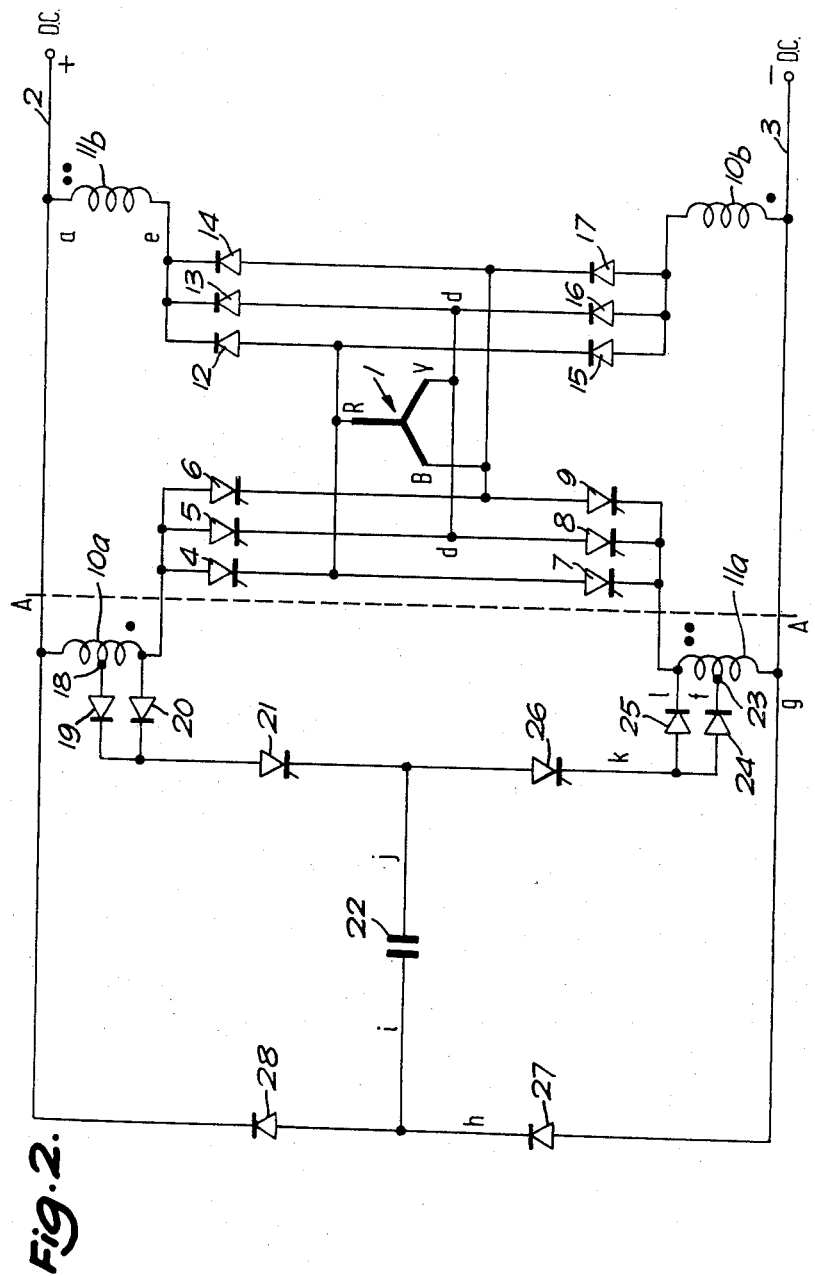
FIG. 2 is a circuit diagram illustrating an inverter circuit according to the invention, but without the necessary auxiliary rectifier circuit which is first introduced in FIG. 5.

Referring to FIG. 2, unlike the inductors of FIG. 1, the inductors of FIG. 2 are double wound. This leads to FIG. 2 being different from FIG. 1 in the following respects:

i. The thyristors 4, 5 and 6 are connected to the positive supply terminal 2 via one winding 10a of a double wound inductor 10.

ii. The thyristors 7, 8 and 9 are connected to the negative supply terminal 3 via one winding 11a of a double wound second inductor 11.

iii. The diodes 12, 13 and 14 are connected to the positive supply terminal 2 via the second winding 11b of the second inductor 11.

iv. The diodes 15, 16 and 17 are connected to the negative supply terminal 3 via the second winding 10b of the first inductor 10.

The first and second windings of each inductor are coupled together magnetically.

The winding 10a also has a tapping 18 which, together with the inverter end, is connected via respective steering diodes 19 and 20 to the anode of a steering thyristor 21, the cathode of which steering thyristor is connected to one plate of a capacitor 22 which is the main commutating capacitor. Similarly, the winding 11a has a tapping 23 which, together with the inverter end is connected via respective steering diodes 24 and 25 and a thyristor 26 to the same plate of the capacitor 22.

Two return-path diodes 27 and 28 are connected in series between the positive supply terminal 2 and the negative supply terminal 3, with both the diodes opposing the dc supply voltage across terminals 2 and 3, the second plate of the capacitor 22 being connected to the junction between the two return-path diodes 27 and 28. The circuit shown in FIG. 2 comprises, essentially a load and inverter bridge, to the right of the dashed line A—A, and a commutation circuit to the left of line A—A. The commutation circuit may be said to consist of two commutation loops. The first commutation loop, operable to turn off the first set of inverter thyristors 4, 5 and 6 comprises the commutation capacitor 22, steering thyristor 21, steering diodes 19 and 20, winding 10a, positive supply terminal 2 and return-path diode 28. The second commutation loop, operable to turn off the second set of inverter thyristors 7, 8 and 9 comprises the commutation capacitor, steering thyristor 26, steering diodes 24 and 25, winding 11a, negative supply terminal 3 and return-path diode 27. Thus the commutation loops have a common branch comprising the commutation capacitor 22, the charge across which reverses each time a thyristor is turned off so that the next time capacitor 22 is capable of turning off a thyristor from the other set.

Figure 3A:
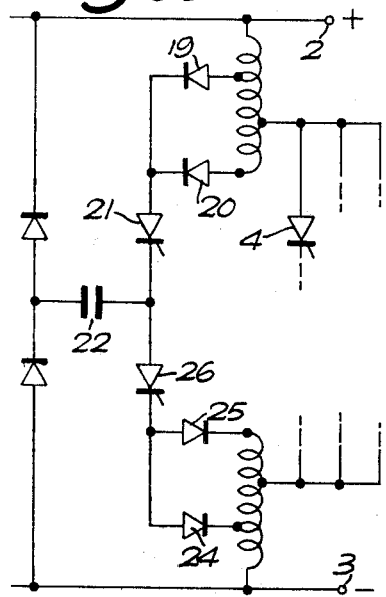
FIGS. 3a and 3b illustrate alternative arrangements of various parts of the inverter circuit of FIG. 2.
Figure 3B:
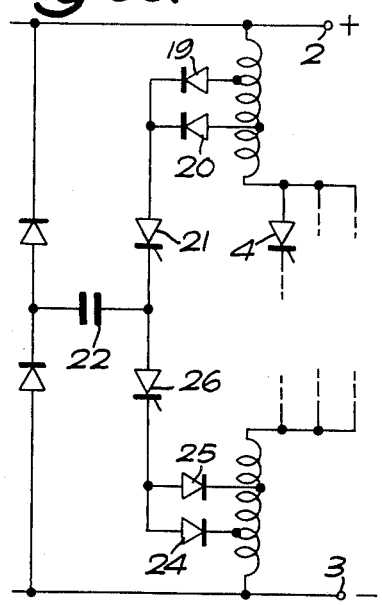

The relative position of the points of connection of the steering diodes and the inverter thyristors, to the windings 10a and 11a may be re-arranged, and FIGS. 3a and 3b show two of the possible arrangements. Other arrangements are possible as can be seen from later FIGS. 19a to 19e. Remembering that the points of connection of the steering diodes to the windings are a particular case of points of selective connection of the commutation capacitor circuit to the windings, FIGS. 19c and 19e correspond to FIGS. 3a and 3b respectively. Therefore, FIGS. 19a, 19b and 19d indicate some additional possible arrangements. For example, FIG. 19d indicates that in FIG. 2 thyristors 7, 8 and 9 may be connected not to end 1 but to a tapping (not shown) between $f$ and $g$. Also, the point $f$ of FIG. 2 may be a centre-tap of the winding 11a and, as shown in FIG. 19b the thyristors 7, 8 and 9 may be connected not to end 1 but to that centre-tap which is also connected into the commutation loop.

In the arrangement of FIG. 3a, the point of connection of the inverter thyristor is no longer at the end of the winding opposite to the supply end, but is intermediate the points of connection of the two steering diodes 24 and 25.

In the arrangement of FIGS. 3b, the inverter thyristors are still connected at the inverter end of the respective first winding, but the point of connection of the steering diode 25 is intermediate the inverter end and the point of connection of the steering diode 24.

Consider an inductor, say inductor 11, in FIG. 2. Let the number of turns between the winding terminals $g$ and $f$, $g$ and $l$, and, $e$ and $a$, be denoted by $N_{g-f}$, $N_{g-1}$ and $N_{e-a}$ respectively. Then turns-ratios $n_1$ and $n_2$ are defined by:

$N_{g-f} : N_{g-1} : N_{e-a} : : 1 : n_1 : n_2$

In a similar way, $n_1$ and $n_2$ apply to the first inductor as well.

Later on the inverter circuit embodiment of FIG. 9 will be considered with reference to the wave-forms of FIG. 10; the pumping of energy to the dc supply by the combined action of the double-wound inductors and the flywheel diode bridge, when the commutation capacitor voltage is excessively high, will also be considered later with reference to FIG. 16. Now a brief description of the operation of the inverter shown in FIG. 2 will be given.

As in the discussion with respect to FIG. 1, also in FIG. 2, say thyristor 8 has to be turned off. From previous operation of the commutation circuit, capacitor 22 will be charged to the voltage $V_c$ with $j$ positive with respect to $i$. In order to turn off the thyristor 8, the thyristor 26 is fired. Current therefore flows in the path $j$-$k$-$f$-$g$-$h$-$i$, thereby applying the voltage $+V_c$ to point $f$ with respect to point $g$. By autotransformer action in the winding 11a of the inductor 11, point 1 assumes a voltage higher than $+V_c$, and, if point 23 is a centre-tap, a voltage $+2V_c$, so that the diode 25 is reverse biased. At the same time, due to transformer action in the inductor 11 the winding 11b tends to cause the voltage at point e to be depressed from the dc supply voltage $V_s$ down to $V_s - n_2V_c$ volts.

The stepped-up voltage in the first winding 11a, and the induced voltage in the second winding 11b act in conjunction to reverse bias, and thereby turn-off, the inverter-thyristor 8 which was previously conducting. As a result of thyristor 8 being turned off, the current previously flowing the path d-l-f-g is diverted to path d-e-a. Subsequently, the voltage across the commutation capacitor 22 reverses due to the ringing effect in the commutation loop. This results in the voltage available from the commutation capacitor to be negative, with respect to the negative terminal of the dc supply, which available voltage is applied to the inverter-end of the first winding 11a of the inductor 11 via the steering diode 25, whilst the steering diode 24 connected to the tapping becomes reverse biased due to step-down action in the winding 11a. When point j was positive with respect to the negative supply terminal, the voltage in the complete first winding 11a was stepped up because the commutation capacitor voltage was applied to the inductor tapping 23 rather than the inverter end. But this cause of stepping up of voltages no longer exists, because the commutation capacitor voltage is now applied to the inverter end, instead of the tapping, of the inductor. Because of the same reason, for a given magnitude of voltage applied by the commutation capacitor circuit to the inductor, the voltage induced in the second winding 11b during the re-set period is reduced to half of that during the period when the turn-off pulse is produced. Therefore, the voltage applied to the inverter thyristors, and hence the voltage rating required of the inverter thyristors, is reduced by in effect stepping down the induced voltages after capacitor voltage reversal.

Of course, this method of reducing the maximum voltages in the inverter results in increased resetting time for the commutation capacitor circuit, since during this resetting time, the commutation loop current passes through the whole of the first winding 11a.

Figure 4A:
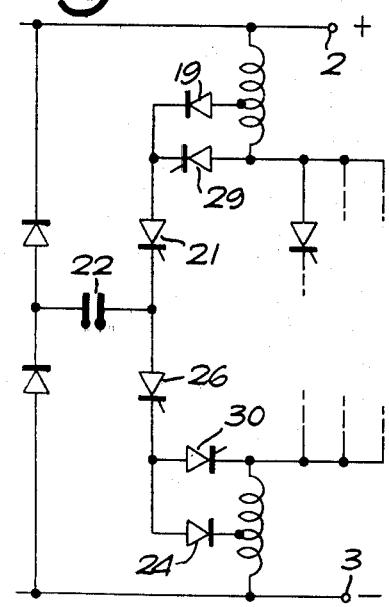
FIGS. 4a, 4b and 4c illustrate alternative arrangements of various other elements of the inverter circuit of FIG. 2.
Figure 4B:
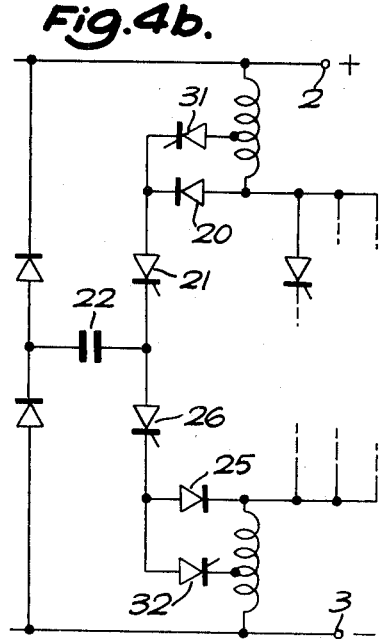

If necessary, this increase in the re-setting time of the commutation capacitor can be reduced by replacing the steering diodes 20 and 25 by steering thyristors 29 and 30 as shown in FIG. 4a. Then the commutation circuit current transfer from the tapping to the inverter-end of the winding can be delayed by phase-controlling this steering thyristor, the delay being so chosen that whilst it reduces the reset time of the commutation circuit it still retains the advantage of reduced voltage rating requirement of the inverter-thyristors. On the other hand, if the steering diodes 19 and 24 are replaced by thyristors 31 and 32 as shown in FIG. 4b, the time for which reverse voltage is applied to an inverter-thyristor can be increased, provided the commutation capacitor 22 is charged to a voltage adequate to reverse bias the inverter thyristor to be turned off. In this circuit, the firing of the thyristor connected to the tap is delayed so that the beginning of the turn-off pulse, current flows through the steering diode connected to the inverter-end of the inductor winding, and thus through the whole winding: only when the reverse voltage applied to the thyristor to be turned off has been reduced to a pre-determined low value, is the reverse voltage step-increased by firing the steering thyristor connected to the tapping of the inductor; when the voltage across the commutation capacitor reverses and the re-set period commences, the steering diode connected to the inductor end commences to conduct in the same way as in FIG. 2.

Figure 4C:
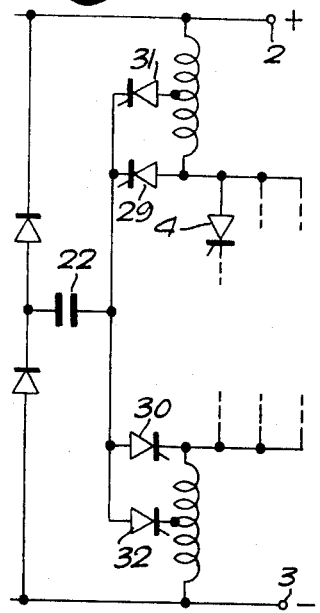

Alternatively, the commutation circuit of FIG. 4c can be used, in which separate steering thyristors are employed, one for the tapping and one for the inverter-end of each first winding of each inductor. By appropriate firing of the steering thyristors, the circuit of FIG. 4c can be made to function like the circuit of FIG. 4a or FIG. 4b. On the other hand, for optimum operation, the circuit of FIG. 4c can be operated so as to combine the advantages of FIGS. 4a and 4b.

However, due to turn-off considerations of the steering thyristors themselves, this intended optimum operation of FIG. 4c may in fact not materialise, and instead may result only in an operation in effect corresponding to FIG. 4b.

It is known that commutation circuits exist in which the commutation capacitor, with an inductor in series, is alternately charged from the dc lines first one way and then the other. This type of circuit has the disadvantage that the successive charging action of the dc supply lines results in the escalation of capacitor voltage to unnecessarily high values with increased voltage rating requirement for the various components of the inverter.

In the embodiments of FIGS. 2 to 15 the charging of the commutation capacitor to excessively high voltages, because of the reason explained in the preceding paragraph, is prevented by never connecting the commutation capacitor across the dc supply lines. Also, were excess energy to appear on the commutation capacitor because of any reason whatsoever, the second windings, when provided, of the inductors act in conjunction with flywheel diodes to extract the excess energy to the dc main supply; this action takes place when a steering thyristor in the commutation circuit is fired, and is described later in relation to FIG. 16.

However, if the commutation capacitor is never connected across the dc supply lines, then, neglecting the inductor's electro-magnetic energy, due to the load current, which is transferred to the commutation capacitor, the commutating circuit, and therefore the inverter as a whole, can function only if it is a loss-free ideal circuit, and it is initially charged, by some means, at the time of switching on the equipment, to the required voltage. However, every practical circuit does have losses so that it is essential to supply the commutation circuit losses.

A part or all of the commutation circuit losses may be supplied by the inductor electro-magnetic energy which is transferred to the commutation capacitor everytime the commutation circuit is operated, and to some extent the magnitude of this electro-magnetic energy can be adjusted at the design stage.

However, in order that the power supplied to the commutation circuit, so as to meet its losses, may be controlled during the inverter's operation, it is necessary to employ the following alternative method.

Figure 5:
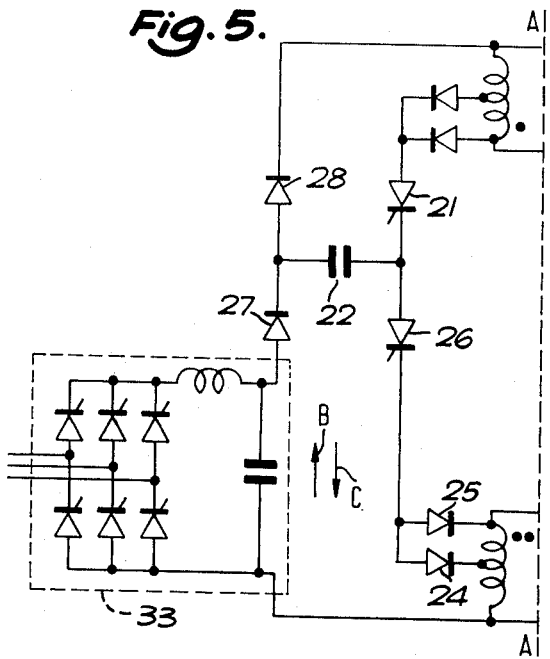
FIG. 5 illustrates a part of the inverter circuit of FIG. 2, including an auxiliary rectifier circuit.

An auxiliary, controlled or half-controlled, rectifier circuit's dc output is inserted in series with a uni-directional current flow path in the commutation circuit so as to provide a variable auxiliary dc voltage to assist current flow, and thus supply the commutation circuit losses. FIG. 5 illustrates the commutation circuit of FIG. 2, in which has been arranged an auxiliary rectifier circuit 33 between the negative supply terminal and the return-path diode 27. The dc voltage supplied by the auxiliary rectifier circuit to assist current flow is indicated by arrow B. However, when the rectifier circuit 33 is fully controlled, and should the commutation capacitor be charged to too high a voltage, this rectifier circuit's dc voltage can in fact be reversed, as indicated by arrow C in FIG. 5 so as to oppose current flow, and thus reduce the voltage to which the commutation capacitor is charged. The rectifier circuit can, of course, be of the uncontrolled type but then the voltage to which the commutation capacitor charges cannot be controlled during the inverter's operation. The rectifier circuit 33 is supplied from a three-phase A.C. auxiliary supply.

By employing the auxiliary rectifier circuit in a closed-loop servo scheme, it can be ensured that the commutation capacitor always charges to the near optimum voltages.

Figure 6:
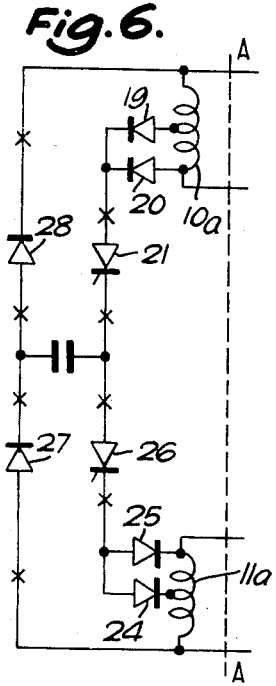
FIG. 6 illustrates the part of the inverter circuit which is shown in FIG. 5, indicating schematically the various possible positions for the auxiliary rectifier circuit(s)

FIG. 6 shows the various positions in the commutation circuit at which the single auxiliary rectifier circuit, or a multiplicity of such circuits, may be located, these various positions being indicated by a cross in the circuit.

Figure 7:
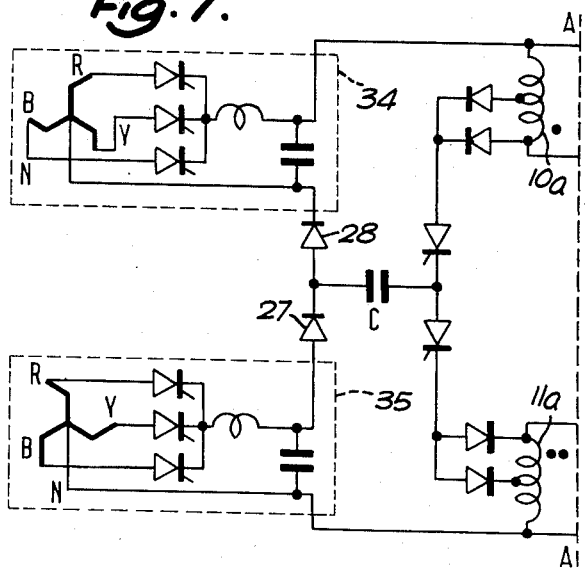
FIG. 7 illustrates a part of the inverter circuit of FIG. 2, including a pair of symmetrically arranged auxiliary rectifier circuits.

A symmetrical version of this method of supplying losses is shown in FIG. 7, where two auxiliary rectifier circuits 34 and 35 are employed, one connected between the positive main dc supply line and the return-path diode 28, and the other connected between the negative main dc supply line and the return-path diode 27. Again, both the auxiliary rectifier circuits may be servo-controlled so as to ensure that the commutation capacitor is charged to the near optimum voltages. The rectifier circuits 34 and 35 are supplied from two transformer secondary windings.

Figure 8:
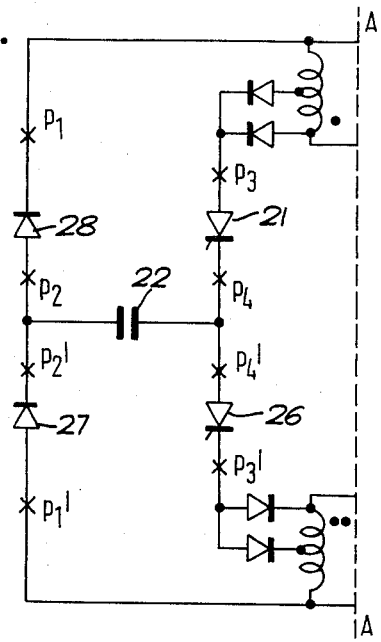
FIG. 8 illustrates that part of the inverter circuit shown in FIG. 7 indicating schematically the various possible positions of the two symmetrically arranged auxiliary rectifier circuits.

FIG. 8 shows schematically a number of different symmetrical arrangements for the case where two auxiliary rectifiers are employed. Each different arrangement is indicated by a pair of associated symbols, e.g. $P_1$ and $P_1'$, or, $P_2$ and $P_2'$, etc. Again the circuits may be controlled, half controlled or uncontrolled. A convenient way to supply the losses is to combine two half-wave or mid-point type of rectifier circuits at points $P_2$ and $P_2'$, or, at points $P_4$ and $P_4'$, FIG. 9 illustrating how the former of these may be put into practice. A 4-wire bridge circuit is employed, the neutral of the A.C. supply being available to the load presented by the commutation circuit.

It is to be noted that the filter inductors, shown at the output of the auxiliary rectifier circuits in FIGS. 5, 7 and 9 can be altogether dispensed with provided the auxiliary ac supply has adequate inductance.

Where two rectifier circuits are each supplied from two separate secondaries as shown in FIG. 7, two alternatives arise:

a. If the secondaries are on separate auxiliary transformers, it is preferable to have zig-zag (inter-star) connection for each secondary in order to prevent saturation due to dc current component in either secondary.

b. If, however, they are on the same transformer core, the two secondaries can be simple stars, and can be made to cancel out the dc ampere-turns of each other by displacing one star by 180° with respect to the other star.

Before the inverter can be operated, it is essential to have the commutation capacitor charged to a certain minimum voltage. This is achieved as follows. Before firing any inverter-thyristor at all, the commutation circuit is repeatedly operated in its two possible modes by the appropriate firing of the steering thyristors, till after a number of charge reversals the charge on the commutation capacitor is built up to an adequate value.

The inverter circuit of FIG. 9 is essentially the circuit of FIG. 2 with an auxiliary rectifier circuit 38 included in it as explained in the foregoing. By way of example, the operation of the circuit shown in FIG. 9 is illustrated by the wave-forms of FIG. 10. In FIG. 9 the various points in the circuit are denoted by lower case letters, whilst in FIG. 10 the wave-forms corresponding to the same points are indicated by the same letters but in the upper case; for example, wave-form F of FIG. 10 applies to point 'f' in the circuit of FIG. 9.

Figure 10:
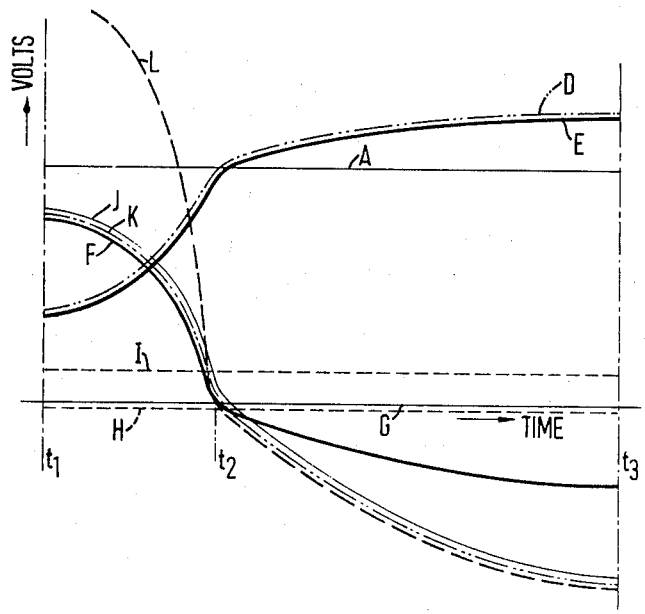
FIG. 10 is a simplified wave-form diagram illustrating the operation of the circuit shown in FIG. 9.

As in the discussions with respect to FIGS. 1 and 2, so also in FIG. 10 the sequence of events associated with the turn-off of thyristor 8 are considered. For simplicity, FIG. 10 omits details which are not essential to the basic operation of the circuit of FIG. 9; for example, the voltage across auxiliary capacitor 37, which is normally substantially smaller than the voltage $V_c$ to which the commutation capacitor 22 is charged, is neglected. In FIG. 10, as throughout this specification, the 'negative line' of the dc supply is taken as the reference, or as zero volts, for expressing all the voltages. Though the forward voltage drops in diodes or thyristors are shown in FIG. 10, they are, in general, negligibly small.

At instant $t_3$ in FIG. 10, capacitor 22 has completed its charging to voltage $V_c$ (or nearly $V_c$) with point 'j' at $-V_c$ volts with respect to 'i', and the capacitor 22 charging current ceases to flow. Capacitor 22 is thus left with a reversed charge which can next be used to turn off one of the thyristors 4, 5 or 6, by firing steering thyristor 21 when events similar to those illustrated in FIG. 10 take place in the other commutation loop.

Figure 11:
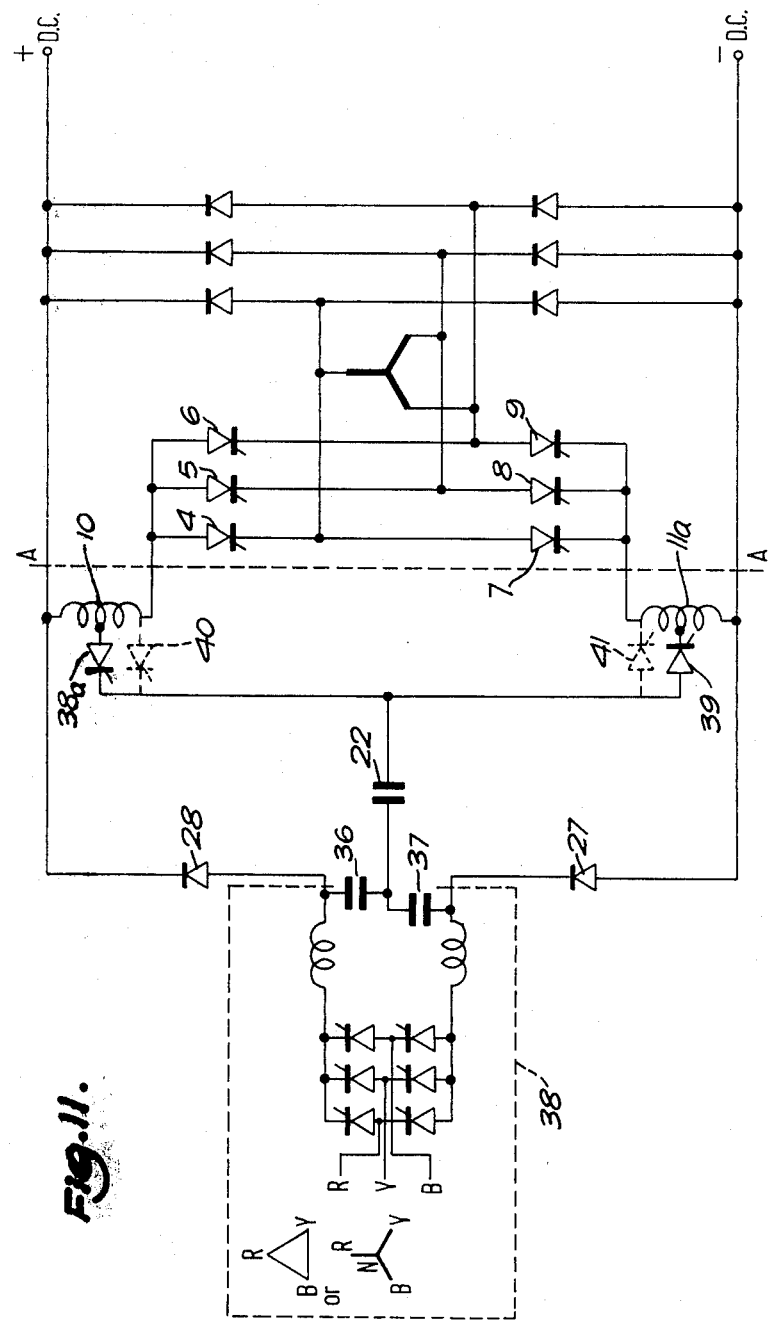
FIG. 11 illustrates another inverter circuit according to the invention.

FIG. 11 illustrates another embodiment of the invention. The neutral connection of the auxiliary rectifier of FIG. 9, i.e. the connection between the neutral of the auxiliary transformer secondary and the junction of the two auxiliary filter capacitors 36 and 37, is not necessary, so that this neutral connection is dispensed with in FIG. 11. Consequently, the auxiliary transformer secondary can be star or delta. In fact, a transformer may not be necessary at all and it may be possible to use any available 3-phase auxiliary supply, except that reasons of isolation may dictate the use of such a transformer.

As shown in FIG. 11, the second windings on the inductors can be ommited, any excess energy transferred from the inductor to the capacitor being removed via the auxiliary rectifier circuit which circuit already exists for providing initial charge to the commutation capacitor and for supplying losses as and when necessary.

The circuit shown in full line in FIG. 11 includes only a single point of connection on each single-wound inductor to the commutation capacitor via a single steering thyristor 38a or 39. This circuit, therefore, does not provide a reduction in the voltage rating requirements for the inverter thyristors.

However, further steering thyrsitors 40 and 41 may be included, as shown in dotted lines in FIG. 11, to provide this desirable voltage rating reduction.

Moreover, the auxiliary rectifier may be located at the junction between the commutation capacitor 22 and the steering thyristors, corresponding to combined positions $P_4P_4'$ of FIG. 8.

FIG. 12 shows a modification of the commutation circuit of FIG. 11, the steering thyristors, the steering diodes, and the winding of each dc line inductor, having been rearranged. Considering one commutation loop, for instance that one which includes the single (or the first) winding of inductor 11, the steering thyristor 26 and the negative dc terminal are both connected to an intermediate tap *m* of the inductor, and two diodes 42 and 43, connect the outer end *n* and another tap *o* to the auxiliary capacitor 37. The diodes 42 and 43 therefore act both as steering and as return-path diodes. The other commutation loop is provided with two similar diodes 44 and 45.

Steering return-path diodes 42 and 44 can also be arranged in another way: For example, considering the inductor 11, FIG. 13 shows how the diode 42 may be connected between the winding section which is controlled only by diode 42 and the rest of the winding on inductor 11. Diode 44 can be connected similarly within inductor 10. This method of connecting a steering or return-path diode or thyristor within an inductor winding may be applied in a number of other Figures in this specification: for example, in FIG. 3a (diodes 20 and 25), FIG. 14 (diode 42), FIG. 18b (thyristor 26), FIGS. 19b to 19d (thyristor 41) and, FIGS. 20 and 21 (thyristors 51 and 52).

Again, considering inductor 11 of FIG. 12, the tapping points *m*, *o* and *n* to which the steering thyristor 26, and the steering/return-path diodes 42 and 43, are connected, can be shifted along the inductor to take any number of alternative positions. FIGS. 14 and 15 show two of these alternatives. In FIG. 14 point *m* has been moved towards point *p* and point *o* coincides with the O-volt or the negative dc line. In FIG. 15, point *m* coincides with point *p*, and point *n* coincides with the O-volt, or, the negative, dc supply line.

Also the point *p* to which a dc end of the inverter thyristor bridge is connected, can also be moved below the inductor "inverter" end, or below point *m*. The comments of the preceding two paragraphs regarding points *m*, *n*, *o* and *p* on inductor 11 also apply in a similar manner to inductor 10, as is evident from FIG. 12.

In the FIGS. 12 to 15 the auxiliary rectifier circuit could have been connected at the junction of steering thyristors 21, 26 and capacitor 22.

Also, if reduction in the voltage rating of the inverter thyristors is not required, the diodes 42 and 44 may be omitted. Moreover, as already described with respect to FIGS. 4a to 4c, one or both of the diodes on each inductor 42 and 43, and, 44 and 45 may be replaced by steering thyristors.

FIGS. 16 to 19e describe an embodiment of the invention according to the subject invention, in which the following features already described in this specification are retained:

i. The use of double-wound inductors which act in conjuction with the fly-wheel diode bridge to deliver excess energy from the commutation capacitor circuit to the dc voltage supply.

ii. The use of steering diodes or steering thyristors in conjunction with tapped inductors so as to reduce the inductor voltage applied to the inverter thyristors during the re-set period.

However, the combination of commutation capacitor circuit and the auxiliary rectifier circuit(s) described in the foregoing is replaced in FIGS. 16 to 19e by simply a 2-capacitor chain.

In FIG. 16, the commutation capacitor comprises two capacitors 46 and 47 connected in series between the dc supply terminals, each being connected in a commutation loop comprising also one of the steering thyristors and one of the inductors. Also, a second winding is provided on each of the inductors 10 and 11, and, the flywheel diode bridge, in addition to its conventional role, is made use of to ensure that when a steering thyristor is fired to turn off an inverter thyristor, the excess energy provided by the dc supply to the commutation capacitor is returned to the dc supply via the second windings and the flywheel diode bridge.

The detailed operation of FIG. 16 will be considered after considering FIG. 18, in order that FIG. 16 may be considered, in conjunction with FIG. 18, for a more general case.

Figure 17:
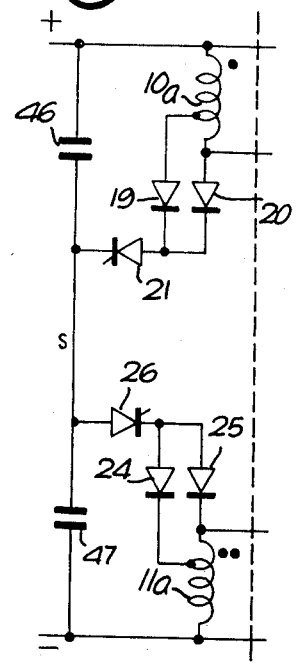
FIG. 17 illustrates a modification of the commutation part of the circuit of FIG. 16.

FIG. 17 differs from FIG. 16 in that it shows, in common with FIG. 2 for example, steering diodes 19, 20, 24 and 25 included in the commutation circuit.

Figure 18A:
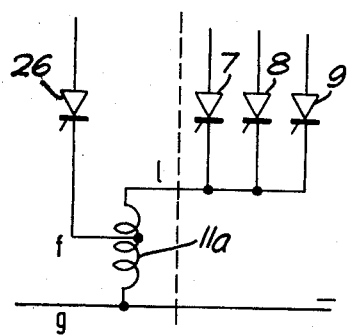
Figure 18B:
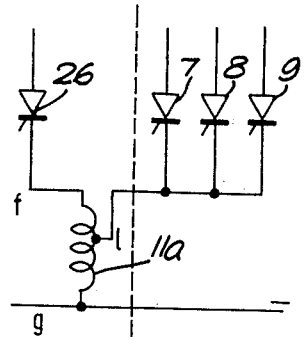

The currents and voltages in the commutation circuit may be adjusted with respect to the currents and voltages in the remainder of the inverter by employing tapped first windings on the inductors as shown in FIGS. 18a and 18b.

The detailed operation of FIG. 16, but in conjunction with FIG. 18, will now be described. That is, it will be assumed that FIG. 16 is altered in one respect: the commutation capacitor circuit is connected to each inductor's first winding at a point different from that at which one end of the inverter thyristor bridge is connected.

As in FIG. 9, the turns-ratios in FIGS. 16 and 18 are respresented by $n_{g-f} : N_{g-1} : N_{e-a} :: 1 : n_1 : n_2$.

As explained with reference to FIG. 9, so also with reference to FIG. 16, in order to turn off inverter thyristor, say 8, steering thyristor 26 is fired which tends to raise point 1 to $n_1 V_c$ volts and depress *e* to $+V_s - n_2 V_c$ volts. Then if $n_1 V_c > V_s - n_2 V_c$, that is if, $V_c > V_s/(n_1 + n_2)$, first the current through thyristor 8 is commutated from path *d-l-g* to path *d-e-a*, and then thyristor 8 is reverse biased.

However, to take the consideration of the action involving double-wound inductors a step further, the return of excess commutation capacitor energy back to the dc voltage supply, via the flywheel diode bridge and the inductor second windings, will commence when the voltage of point e equals the voltage point *r*, that is, when $V_s - V_c n_2 = V_c n_2^2/n_1$, that is when, $V_c = n_1 V_s/n_2 (n_1 + n_2)$. If $V_c$ is greater than this value, energy is returned to the dc voltage supply.

In order that the minimum value of $V_c$ at which energy can be delivered to the dc supply may be more than the minimum value of $V_c$ at which inverter thyristors can be reversed biased, it follows from the last two paragraphs that $n_1$ must be greater than $n_2$.

Various ways of reducing the voltage rating requirements of the inverter thyristors by employing two, instead of one, steering thyristors per tapped first winding of an inductor are illustrated in FIGS. 19a to 19e with respect to one commutation loop and the associated inverter thyristors. The circuit of FIG. 19a has in fact been already considered with reference to FIG. 4c and to the option of additional steering thyristors shown in broken-line in FIG. 11.

A corollary of the use of double-wound inductors, already described in this specification of the invention, is that the commutation circuit can be connected to those inductor windings which are connected to the flywheel diode bridge, instead of to the inductor windings which are connected to the thyristor bridge. Thus:

i. The inverter circuit of FIG. 16, incorporating the circuit of FIG. 19c, can be modified to that of FIG. 20.

ii. The inverter circuit corresponding to the combination of FIGS. 9 and 4c, can be modified to that of FIG. 21.

As an example, the operation of the circuit of FIG. 20 will now be described:

To turn off inverter thyristor, say 8, it is a pre-requisite that point S in the capacitor chain is already charged to a negative voltage with respect to point '*a*'. Assuming this condition is met, the commutation circuit thyristor 49 is fired. Then by transformer action in the second inductor, point 1 is made positive with respect to point d to turn off thyristor 8, and, the previous current flow through thyristor 8 is now replaced by two current flows indicated by the broken line (-----) and the chain-dotted (-----) arrows. A current also flows through thyristor 49, capacitor 47 and the dc supply, but is neglected here because it is not essential for explaining the basic principle.

By the time the current in the commutation capacitor circuit, as indicated by the chain dotted arrows, is reduced to zero and thereby the steering thyristor 49 is turned off, point S is left at a voltage which is positive with respect to both point '*a*' and point '*g*'. The commutation circuit is now set ready to turn off one of the inverter thyristors 4, 5 or 6, next time.

Moreover, if at the instant of firing of the thyristor 49, point S is excessively negative with respect to point '*a*', a 3rd current as indicated by the dotted arrows (-----) flows to return excess energy from the commutation capacitor back to the dc supply.

The methods of adjusting currents and voltages in the commutation circuit and of reducing the inverter thyristor voltage ratings, as illustrated in FIGS. 18 and 19, can also be applied to FIG. 20 where steering thyristors 51 and 52 in the broken line paths may be included to reduce the voltage rating requirements of the inverter thyristors.

I claim:

1. An inverter for supplying alternating current to a load from a direct current supply, including a controlled rectifier bridge which comprises a respective pair of first and second controlled rectifiers for connecting each A.C. supply terminal of the load to the positive and negative terminals of the direct current supply, the first controlled rectifier of each pair being connected to the positive supply terminal through at least part of a first inductor, and the second controlled rectifier of each pair being connected to the negative supply terminal through at least part of a second inductor, a flywheel diode bridge comprising a respective pair of flywheel diodes also for connecting each A.C. supply terminal of the load to the direct current supply terminals and a commutation circuit including a selectively dischargeable commutation capacitor for causing current to flow in one or other of said inductors and thereby to reverse bias so as to turn off a conducting one of the rectifiers connected thereto, wherein each inductor is provided with a second winding, which is magnetically coupled with the first winding of the inductor, the second winding of the first inductor being connected between the negative direct current supply terminal and the respective end of the flywheel diode bridge, and the second winding of the second inductor being connected between the positive direct current supply terminal and the respective end of the flywheel diode bridge, the polarity of the first and second windings of each inductor being such that when the first winding of the second inductor makes the thyristor bridge end connected thereto more positive than the negative supply potential, the second winding thereof makes the flywheel diode bridge end connected thereto less positive than the positive supply potential, and such that when the first winding of the first inductor makes the thyristor bridge end connected thereto less positive than the positive supply potential the second winding thereof makes the flywheel diode bridge end connected thereto more positive than the negative supply potential.

2. An inverter according to claim 1 wherein for each inductor, the number of turns of the second winding connected between the respective direct current supply terminal and the respective dc end of the flywheel diode bridge is made smaller than the number of turns of the first winding connected between the respective direct current supply terminal and the respective point of connection to the inverter thyristor bridge, so as to ensure that reverse biasing of the inverter-thyristor to be turned off is achieved at a commutation capacitor voltage lower than that which enables the combination of the second windings and the flywheel diode bridge to extract excess energy from the commutation capacitor to deliver it to the dc supply.

3. An inverter according according to claim 1 wherein each of said first or second windings has three points connected into said commutation circuit, namely an intermediate point and a further point on either side thereof, the intermediate point and one of said further points each being connected via a respective single anode rectifier into a respective loop containing the commutation capacitor, the loop completing itself through the other said further point on the inductor.

4. An inverter for supplying alternating current to a load from a direct current supply, comprising a respective pair of first and second controlled rectifiers for connecting each A.C. supply terminal of the load to the positive and negative terminals of the direct current supply, the first controlled rectifier of each pair being connected to the positive supply terminal through at least part of a first inductor, and the second controlled rectifier of each pair being connected to the negative supply terminal through at least part of a second inductor, a flywheel diode bridge comprising a respective pair of flywheel diodes also for connecting each A.C. supply terminal of the load to the direct current supply terminals, and a commutation circuit including a selectively dischargeable commutation capacitor for causing current to flow in one or other of said inductors, each of which, or a part thereof, is connected in a respective commutation loop in which discharge current from said commutation capacitor will flow, and thereby to reverse bias so as to turn off a conducting one of the rectifiers connected thereto, wherein said commutation capacitor is arranged so that it is never connected across the direct current supply and therefore never draws charging current therefrom, and wherein means are therefore provided for charging and for increasing or decreasing the voltage of said commutation capacitor, said means comprising an auxiliary direct current power supply connected in series in a uni-directional current path of one of the said commutation loops.

5. An inverter according to claim 4 wherein said auxiliary direct current power supply comprises an auxiliary controlled rectifier circuit arranged for connection to an alternating current supply and for the production of a rectified voltage across an auxiliary capacitor connected in said commutation loop, the auxiliary rectifier circuit current carrying capability being in the same direction as that of the uni-directional current in said commutation loop.

6. An inverter according to claim 5 wherein the said auxiliary rectifier circuit is a controlled circuit.

7. An inverter according to claim 6 wherein the said auxiliary rectifier circuit is a half-controlled circuit.

8. An inverter according to claim 5 wherein a plurality of said auxiliary rectifier circuits are provided, each being located at one of a plurality of points in one or both of the commutation capacitor circuit loops.

9. An inverter circuit according to claim 8 wherein a plurality of the said auxiliary rectifier circuits are combined by employing a common auxiliary alternating current supply transformer with a common primary.

10. An inverter according to claim 9, wherein said commutation loops have a common branch in which is located said commutation capacitor, wherein each loop contains a said auxiliary rectifier circuit and auxiliary capacitor, located at point where the two commutation loops merge into said common branch, said auxiliary capacitors being connected in series, with their point of connection connected via a part of said common branch to one electrode of the commutation capacitor, and wherein said auxiliary rectifier circuits are replaced by a single auxiliary rectifier circuit arranged to produce a rectified voltage across said series connected auxiliary capacitors.

11. An inverter according to claim 6 wherein the said auxiliary rectifier circuit is fully controlled.

12. An inverter for supply alternating current to a load from a direct current supply, comprising a respective pair of first and second controlled rectifiers for connecting each A.C. supply terminal of the load to the positive and negative terminals of the direct current supply, the first controlled rectifier of each pair being connected to the positive supply terminal through at least part of a first inductor, and the second controlled rectifier of each pair being connected to the negative supply terminal through at least part of a second inductor, a respective pair of flywheel diodes also for connecting each A.C. supply terminal of the load to the direct current supply terminals and a commutation circuit including a selectively dischargeable commutation capacitor for causing current to flow in one or other of said inductors and thereby to reverse bias so as to turn off a conducting one of the rectifiers connected thereto, each said indicator comprising a winding having three points connected in said commutation circuit, namely an intermediate point and a further point on either side thereof wherein there is provided in respect of each inductor a pair of single-anode rectifiers coupled to connect either said intermediate point or said first further point into a respective loop containing the commutation capacitor, the loop completing itself through the other said further point on the inductor, whereby said loop may contain either the part of the inductor between the other further point and the intermediate point or the part between the said other further point and the first further point depending upon which of said respective single-anode rectifiers is in a conductive state.

13. An inverter according to claim 12, wherein in respect of each inductor winding, a first one of said single-anode rectifiers is series connected within that winding between said first further point and the next connection point on the winding, which may be the said intermediate point or a point connected to the controlled rectifiers of the inverter or to a D.C. supply terminal, wherein the other of said single-anode rectifiers connects said intermediate point to a common connection on said commutation loop, wherein said first further point is connected to said common connection, so that when only said first one of said single-anode rectifiers conducts, the part of the inductor between said first further point and said other further point is connected into said commutation loop, and when only said other of said single-anode rectifiers conducts, the part of the inductor between said intermediate point and said other further point is connected into said commutation loop.

14. An inverter according to claim 12 wherein said intermediate and first further point on the first inductor are connected to the cathodes of the respective single anode rectifiers, the anodes of which are commoned together and said intermediate and first further point on the second inductor are connected to the anodes of the respective single anode rectifiers, the cathodes of which are commoned together, said commoned anodes and commoned cathodes being connected in the respective loops.

15. An inverter according to claim 12 wherein said intermediate and first further point on the first inductor are connected to the anodes of the respective single anode rectifiers, the cathodes of which are commoned together, and said intermediate and first further point on the second inductor are connected to the cathodes of the respective single anode rectifiers, the anodes of which are commoned together, said commoned cathodes and commoned anodes being connected in the respective loops.

16. An inverter according to claim 15, wherein said single-anode rectifiers are non-controlled and are connected so as to point in the forward direction of the direct current supply and wherein, in respect of each inductor, a controlled single anode rectifier is series connected, in the respective commutation loop, to the respective commoned electrodes of the said non-controlled, single-anode rectifiers.

17. An inverter according to claim 12, wherein said commutation capacitor is arranged so as never to be connected across the direct current supply and wherein means are therefore provided for charging and for increasing or decreasing the voltage on said commutation capacitor, said means comprising an auxiliary direct current power supply connected in series in a unidirectional current part of one of the said commutation loops.

18. An inverter according to claim 17 wherein said auxiliary direct current power supply comprises an auxiliary rectifier circuit arranged for connection to an alternating current supply and for the production of a rectified voltage across an auxiliary capacitor connected in said commutation loop, the auxiliary rectifier circuit current carrying capability being in the same direction as that of the uni-directional current in said commutation loop.

19. An inverter according to claim 18 wherein said single anode rectifiers are connected so as to point in a direction opposing the direct current supply, and are both of the uncontrolled type, the said commoned electrodes being connected directly, or via an auxiliary rectifier circuit, to one terminal of the commutation capacitor.

20. An inverter according to claim 19 wherein a single-anode rectifier is series-connected, in the commutation loop, between the other terminal of commutation capacitor and the other further point.

21. An inverter according to claim 12, wherein said controlled rectifiers form a 3-phase bridge, and wherein said flywheel diodes form a 3-phase flywheel diode bridge.

22. An inverter according to claim 12 wherein said controlled rectifiers are thyristors.

23. An inverter for supplying alternating current to a load from a direct current connected comprising a respective pair of first and second controlled rectifiers for connecting each A.C. supply terminal of the load to the positive and negative terminals of the direct current supply, the first controlled rectifier of each pair being connected to the positive supply terminal through at least part of a first inductor, and the second controlled rectifier of each pair being connected to the negative supply terminal through at least part of a second inductor, a flywheel diode bridge comprising a respective pair of flywheel diodes also for connecting each A.C. supply terminal of the load to the direct current supply terminals, and a commutation circuit including a selectively dischargeable commutation capacitor means for causing current to flow in one or other of said inductors and thereby to reverse bias so as to turn off a conducting one of the rectifiers connected thereto wherein the commutation capacitor means comprises two capacitors which are connectd in series across the main dc supply and are selectively connectable to the inductors to develop controlled rectifier turn-off voltage pulses across the inductors.

* * * * *